(12) United States Patent  
Kemkemian et al.

(10) Patent No.: US 8,354,950 B2  
(45) Date of Patent: Jan. 15, 2013

(54) METHOD FOR CHARACTERIZING AN ATMOSPHERIC TURBULENCE USING REPRESENTATIVE PARAMETERS MEASURED BY RADAR

(75) Inventors: Stéphane Jean Kemkemian, Paris (FR); Héléne Catherine Thuilliez, Elancourt (FR); Myriam Patricia Nouvel, Elancourt (FR)

(73) Assignee: Thales, Neuilly sur Seine (FR)

( * ) Notice: Subject to any disclaimer, the term of this patent is extended or adjusted under 35 U.S.C. 154(b) by 186 days.

(21) Appl. No.: 12/664,813

(22) PCT Filed: Jun. 13, 2008

(86) PCT No.: PCT/EP2008/057516  
§ 371 (c)(1),  
(2), (4) Date: Mar. 22, 2010

(87) PCT Pub. No.: WO2008/155299  
PCT Pub. Date: Dec. 24, 2008

(65) Prior Publication Data  
US 2010/0188283 A1 Jul. 29, 2010

(30) Foreign Application Priority Data  
Jun. 15, 2007 (FR) .................................... 07 04282

(51) Int. Cl.  
*G01S 13/95* (2006.01)  
*G01S 13/00* (2006.01)

(52) U.S. Cl. ......... 342/26 R; 342/26 B; 342/89; 342/94; 342/175; 342/192; 342/195

(58) Field of Classification Search ....... 342/26 R–26 D, 342/27, 28, 82, 89–103, 175, 192–197  
See application file for complete search history.

(56) References Cited

U.S. PATENT DOCUMENTS

| | | | | |
|---|---|---|---|---|
| 3,646,555 | A * | 2/1972 | Atlas | 342/26 R |
| 4,223,309 | A * | 9/1980 | Payne | 342/26 B |
| 5,164,731 | A * | 11/1992 | Borden et al. | 342/26 B |
| 5,955,985 | A | 9/1999 | Kemkemian et al. | |
| 5,963,163 | A | 10/1999 | Kemkemian et al. | |
| 6,389,084 | B1 * | 5/2002 | Rupp | 342/101 |
| 7,132,974 | B1 | 11/2006 | Christianson | |
| 8,120,523 | B2 | 2/2012 | Kemkemian et al. | |

(Continued)

OTHER PUBLICATIONS

R. C. Srivastava et al.—"Effect of Finite Radar Pulse Volume on Turbulence Measurements"; Journal of Applied Meteorology (USA) (vol. 13, No. 4, pp. 472-480); Published Jun. 4, 1974, XP-2471915A.

(Continued)

*Primary Examiner* — Bernarr Gregory  
(74) *Attorney, Agent, or Firm* — Baker & Hostetler LLP

(57) ABSTRACT

The present invention relates to a method for characterizing an atmospheric turbulence by representative parameters measured by a radar. The emission beam of the radar carried by an aircraft scanning the zone of the turbulence, a measured parameter being the total variance of the velocity of the turbulence $\sigma_U$, this total variance at a point $x_0$ inside the turbulence is the sum of the spatial variance of the spectral moment of order 1 of the signals received by the radar $\mathrm{Var}[M1(\vec{x})]$ and of the spatial mean of the spectral moment of order 2 of the signals received $\mathrm{Mean}[M2(\vec{x})]$, the moments being distributed as a vector $\vec{x}$ sweeping an atmospheric domain around the point $x_0$. The invention applies notably in respect of meteorological radars fitted to aircraft such as airliners for example.

10 Claims, 4 Drawing Sheets

U.S. PATENT DOCUMENTS

2008/0180323 A1     7/2008    Kemkemian et al.
2008/0291082 A1    11/2008    Kemkemian
2009/0278729 A1    11/2009    Bosser et al.

OTHER PUBLICATIONS

Jonggil Lee, "Robust Estimation of Mean Doppler Frequency for the Measurement of Average Wind Velocity in a Weather Radar"; IEEE International Conference on Adelaide, SA, Australia (vol. iv No. 4, p. IV-197); Published Apr. 19, 1994, XP-10134016A.

Theagenis J. Abatzoglou et al., "Comparison of Maximum Likelihood Estimators of Mean Wind Velocity from Radar/Lidar Returns"; Conference Record of the Thirtieth Asilomar Conference on Pacific Grove, Los Alamitos, CA, USA (vol. 1, pp. 156-160); Published Nov. 3, 1996, XP-10231412A.

\* cited by examiner

METHOD FOR CHARACTERIZING AN ATMOSPHERIC TURBULENCE USING REPRESENTATIVE PARAMETERS MEASURED BY RADAR

CROSS-REFERENCE TO RELATED APPLICATIONS

This application is a National Stage of International patent application PCT/EP08/057516, filed on Jun. 13, 2008, which claims priority to foreign French patent application No. FR 0704282, filed on Jun. 15, 2007, the disclosures of which are hereby incorporated by reference in their entirety.

FIELD OF THE INVENTION

The present invention relates to a method for characterizing an atmospheric turbulence by representative parameters measured by a radar. It applies notably in respect of meteorological radars fitted to aircraft such as airliners for example.

BACKGROUND OF THE INVENTION

Aerial navigation seeks to avoid turbulent atmospheric zones. To detect them and anticipate them, aircraft are generally furnished with a radar, the antenna of which scans and illuminates the regions through which the carrier aircraft is liable to pass. The reception and processing of the meteorological echoes, after eliminating echoes of another nature such as ground echoes for example, provide the variance of the radial velocity field of the wind, more particularly of the moment of radial velocity of order 2.

In reality, the velocity of the wind is not measured directly, but rather the velocity of tracers entrained by the motions of the air mass is measured. These tracers are, more often than not, hydrometeors such as drops of water, snow, hail or supercooled ice for example. Near the ground, it is also possible to utilize the reflection of the radar waves on non-aqueous meteors, such as dust or insects for example, entrained by atmospheric motions. Nevertheless at high altitude, only hydrometeors are usable.

A meteorological radar first identifies the dangerous zones through a reflectivity measurement. Indeed, high reflectivity corresponds to significant precipitations and therefore to dangerous convective phenomena. Conversely there exist situations from the point of view of aerial navigation which are not necessarily associated with a high reflectivity. Such situations are encountered notably:

in the vicinity of convective systems where dangerous air motions may be present without significant precipitations;
because hydrometeors present at high altitude are more often than not frozen and therefore weakly visible to a conventional meteorological radar.

Moreover, it is desirable that the crew of an aircraft be afforded the earliest possible alert so as to reroute the aircraft or to take the necessary measures to guarantee the safety of the passengers on board.

One problem is related to aircraft carriage constraints. Indeed, the emission power and the dimension of aerial equipment being limited by these carriage constraints, it is consequently necessary for measurement algorithms to be as sensitive as possible.

Another problem stems from the fact that knowledge of the variance of the wind field velocity is not alone sufficient to measure the degree of severity of the effect of turbulence on an aircraft. Indeed for a given variance the effect on the airplane, measured in terms of load factor, depends on the way in which this turbulent velocity field varies over time when the aircraft passes through it. Stated otherwise, fine characterization of the impact of turbulence on an aircraft requires the measurement of the spatial autocorrelation function of the turbulent velocity field.

SUMMARY OF THE INVENTION

An aim of the invention is notably to overcome the aforesaid problems. For this purpose, the subject of the invention is a method for characterizing an atmospheric turbulence by representative parameters measured by a radar whose emission beam scans the zone of the turbulence, characterized in that a measured parameter being the total variance of the velocity of the turbulence $\sigma_U$, this total variance at a point $x_0$ inside the turbulence is the sum of the spatial variance of the spectral moment of order 1 of the signals received by the radar $\mathrm{Var}[M1(\vec{x})]$ and of the spatial mean of the spectral moment of order 2 of the signals received $\mathrm{Mean}[M2(\vec{x})]$, the moments being distributed as a vector $\vec{x}$ sweeping an atmospheric domain around the point $x_0$.

BRIEF DESCRIPTION OF THE DRAWINGS

Other characteristics and advantages of the invention will become apparent with the aid of the description which follows, offered in relation to appended drawings which represent.

DETAILED DESCRIPTION

Figure 1:
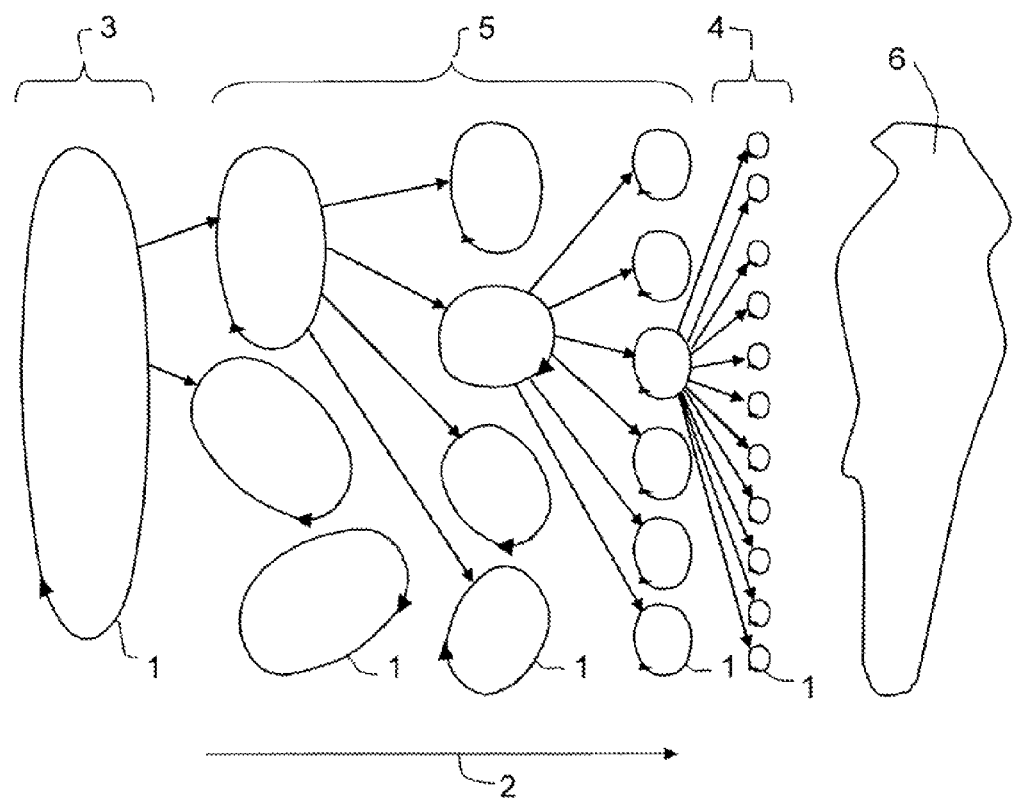
FIG. 1, an illustration of a mechanism of atmospheric turbulence.

FIG. 1 illustrates the mechanism of atmospheric turbulence, more particularly the mechanism of injection, cascade and progressive dissipation of turbulent energy. A turbulent phenomenon is characterized by the presence of velocity swirls 1 within the fluid, of various scales, and the progressive degradation over time 2 from large-scale phenomena 3 to small-scale phenomena 4, and then their disappearance through thermal dissipation.

If at an instant t a swirling motion 1, 3 of kinetic energy E per unit mass, for example due to a convection phenomenon, is initiated at a large scale $L_1$, termed the injection scale:

initially, this swirling motion 1 of energy E degrades progressively into swirling motions 5, 4 of smaller scales with conservation of kinetic energy;

when the swirling motion 1, 4 has attained a small scale $L_2$ such that the associated Reynolds number corresponds to a viscous phenomenon which is predominant in relation to the inertial phenomena, the swirling kinetic energy is dissipated in the form of heat 6.

By way of indication, the swirls of large scale 3 can attain an amplitude of the order of 10 km whereas the swirls of smaller scale 4 have an amplitude of the order of a centimeter. Six orders of magnitude are usually observed between the scales $L_1$ and $L_2$.

If the system is continuously supplied with energy, an equilibrium state is established between the energy injection at large scale $L_1$ 3 and its thermal dissipation at small scale $L_2$ 4. The interval of scales $[L_1, L_2]$ is called the inertial domain.

On the energy injection scale $L_1$ the distribution of the swirls is generally anisotropic. On the other hand toward the smallest scales of the inertial domain, the swirling velocity distribution becomes isotropic and can be described in random process terms.

Figure 2:
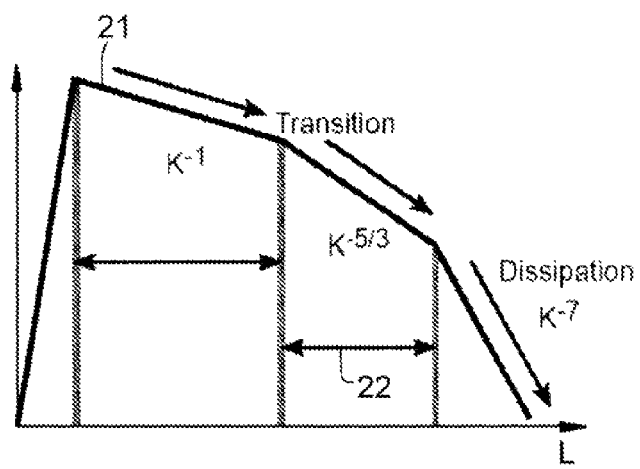
FIG. 2, a presentation of the kinetic energy spectrum as a function of the inverse of the spatial scale (wave number k)

FIG. 2 presents the general shape of a kinetic energy spectrum as a function of the scale L of the inertial domain. It has been shown that the turbulent energy is distributed according to a law such as illustrated by curve 21 of FIG. 2. Any turbulence possesses in particular certain characteristic attributes:

a total kinetic energy per unit mass, corresponding to the integral of the curve of FIG. 2 referred to by the acronym TKE standing for the expression "Turbulent Kinetic Energy", TKE being defined according to the following relation:

$$TKE = \frac{1}{2}(\sigma_U^2 + \sigma_V^2 + \sigma_W^2) \quad (1)$$

where $\sigma_U$, $\sigma_V$, $\sigma_W$ represent the variances in velocity in three directions U, V, W of an orthonormal reference frame;

a dominant turbulence wavelength similar to the injection scale $L_1$;

a zone 22 of the inertial domain, toward the small scales, where the spectral energy density varies as $k^{-5/3}$ and where the statistical properties are isotropic.

Figure 3:
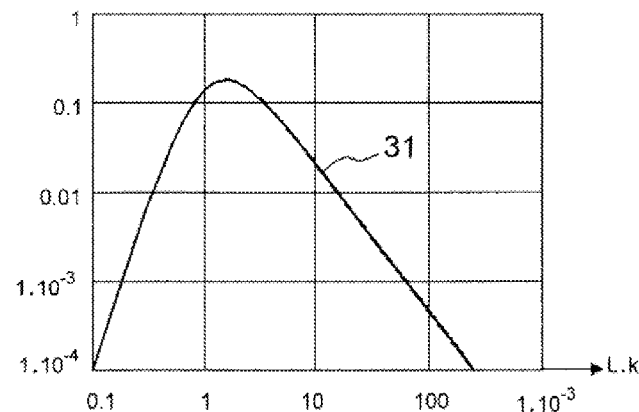
FIG. 3, a curve representative of an energy distribution as a function of a reduced wave number.

FIG. 3 presents through a curve 31 an exemplary energy distribution according to Von Karman as a function of a variable L.k defined hereinafter, represented on a logarithmic scale. It is known in the field of airborne meteorological radars to use the modelling of the Von Karman turbulent kinetic energy spectrum which provides a good representation of the turbulent phenomena which are troublesome to aerial navigation. This model stipulates an isotropic turbulence. This property is not always satisfied at the turbulence scales which impact the flight of an aircraft, nevertheless a few simple corrections of this model allow its use with a good degree of representativity. The Von Karman model for the energy E(k) uses a distribution of the kinetic energy according to the following relation, a function of the scalar number k:

$$E(k) = \frac{\sigma^2 L}{2\mu} \frac{(L \cdot k)^4}{(1 + (L \cdot k)^2)^{17/6}} \quad (2)$$

where the constant $\mu$ is substantially equal to 1.033 and $L = 1.339 \, L_1$. Moreover, the velocity variance $\sigma$ satisfies $\sigma^2 = \frac{1}{3}\sigma_U^2 = \frac{1}{3}\sigma_V^2 = \frac{1}{3}\sigma_W^2$.

In the example of FIG. 1, the distribution begins by increasing substantially linearly from a value L.k=0.1 and then decreases in a substantially linear manner from a value L.k close to 1.

According to the invention, it is considered that the atmospheric turbulences troublesome to an aircraft are isotropic and obey for example the Von Karman energy distribution or any other energy distribution correctly modelling the turbulent phenomenon to be analysed. Under these conditions such turbulence is characterized from the point of view of its kinetic energy and of its velocity-wise spatial autocorrelation function by the following two parameters:

the velocity variance $\sigma_L$ of the longitudinal component of velocity along an arbitrary axis;

the turbulence injection scale $L_1$.

Advantageously, the invention allows measurement of these two parameters with a radar.

In a possible mode of implementation, the radar emits pulses of a duration $\tau$ which may optionally be compressed. In this case $\tau$ then denotes the duration of the compressed pulse. The radar is of Doppler type in the sense that it makes it possible to measure the phase between the signal received from an echo and the signal emitted. The pulse repetition period $T_R$ can be variable. However the description of the invention which follows is given assuming it to be constant, with the aim notably of simplifying the description. Likewise, it is not necessary for the radar to be pulsed, provided that the emitted signals exhibit sufficient band to ensure the required distance-wise discrimination. This could be for example a radar of frequency-modulated continuous wave FM-CW type.

Figure 4:
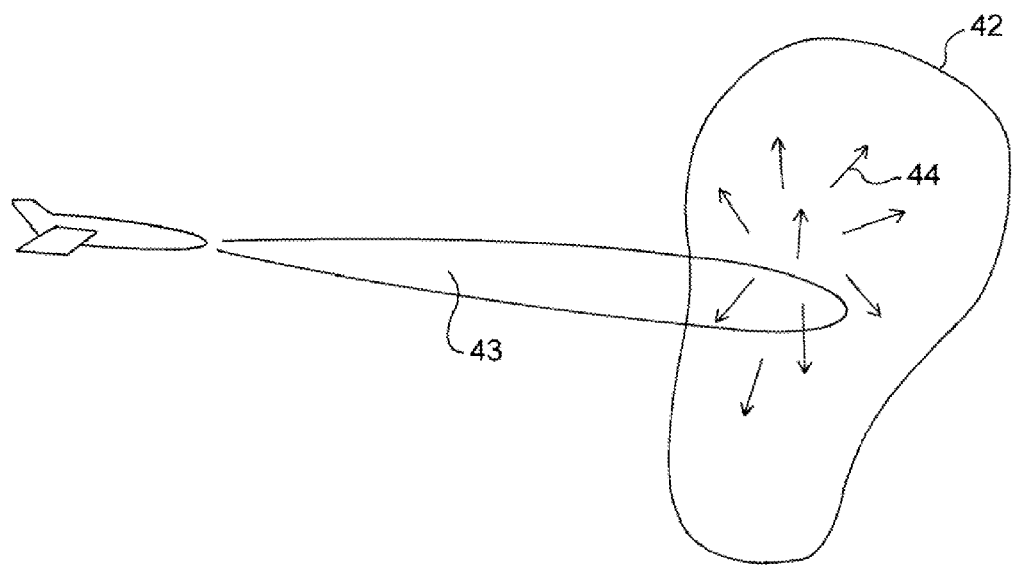
FIG. 4, an aircraft equipped with a radar approaching a turbulence zone.

FIG. 4 shows an airplane 41 equipped with a radar approaching a turbulence zone 42. The radar performs a scan 43 of the space to be monitored. The radar beam 43 encounters tracers whose swirling motions are caused by turbulence. Inside the turbulence zone 42 there is then a distribution of the various velocity vectors 44 related to each tracer. This distribution has a certain spatial variance.

No constraint on the nature of this scan is introduced. It can be performed successive line-wise at constant elevation, vertically at successive constant azimuths, circularly, in a discontinuous manner, etc. for example. During the scan, a fixed point in space is illuminated by the radar for a time $T_{ILLU}$. To this time there corresponds a number of emitted radar pulses N.

Doppler processing makes it possible to estimate, per radar resolution cell, three useful spectral moments:

the spectral moment of order 0 reflected by the power of the echo received in this cell, this moment making it possible to estimate the signal-to-noise ratio S/N of the measurements and to validate them if it exceeds a given threshold;

the spectral moment of order 1 which is the mean radial velocity of the hydrometeors, weighted on the one hand by the reflectivity field and on the other hand by the power response of the radar resolution cell;

the spectral moment of order 2 which is the variance in radial velocity of the hydrometeors, weighted by the same effects as the moment of order 1.

By virtue of the scan of the radar beam these spectral moments are known at a series of points i labelled by vectors $\vec{x}_i$.

The impact of the pulse resolution volume on the radar measurements is known, in particular from the work of Shrivastava and Atlas in 1974. Indeed a radar resolution cell, defined by its distance-wise resolution and the aperture of the antenna beam, delimits a certain pulse resolution volume. A cell of given resolution allows only local and incomplete observation of the properties of the turbulent velocity field. It is apparent that:

the variance in radial velocity of the tracers present in a given cell reflects rather more the velocity variations over lengths smaller than the dimensions of the resolution cell, therefore variations of short wavelength;

on the other hand, the statistical analysis of the moments of order 1 over several resolution cells reflects rather more the variations of large wavelength of the radial velocity field.

It has been shown that, over an inertial domain in which the turbulence possesses homogeneous statistical properties, the total variance in radial velocity $\sigma_U$ around a point with vector $\vec{x}_0$ can be defined by the following relation:

$$\sigma_U^2(\vec{x}_0) = \text{Mean}[M2(\vec{x})] + \text{Var}[M1(\vec{x})] \quad (3)$$

$M1(\vec{x})$ and $M2(\vec{x})$ being respectively the spectral moment of order 1 and the spectral moment of order 2 at the point with vector $\vec{x}$. Mean being the mean function and Var being the variance function, the vector $\vec{x}$ sweeping an atmospheric domain around $\vec{x}_0$ which is greater than the scale of the turbulence but within which it is stationary.

Figure 5:
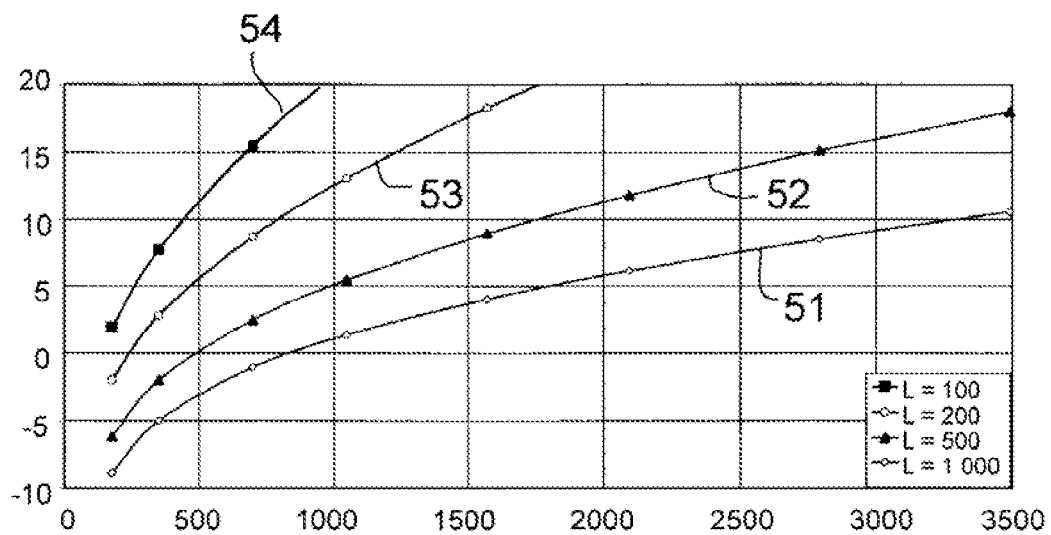
FIG. 5, a net of curves representative of turbulence scales as a function of measured radar parameters.

FIG. 5 shows through several curves 51, 52, 53, 54 representations of turbulence scales as a function of the lateral aperture of the −3 dB antenna lobe. More particularly, FIG. 5 presents for several scales the ratio y, represented in dB, defined as follows:

$$y = \frac{\text{Mean}[M2(\vec{x})]}{\text{Var}[M1(\vec{x})]} \quad (4)$$

The effect of the dimension of the resolution volume can be exploited to evaluate the scale of the turbulence. FIG. 5 shows that measurement of the ratio y makes it possible to estimate the scale of the turbulence around $\vec{x}_0$. The ratio y is dependent on several parameters, it is in particular dependent on:

the scale of the turbulence $L_1$ which is the unknown;

the distance resolution $Q_d$, $Q_d$ being equal to $c\tau/2$, c being the velocity of light and $\tau$ the pulse duration defined previously;

the angular metric resolution $Q_t$, $Q_t$ being equal to $R.\theta_{3dB}$, R being the distance and $\theta_{3dB}$ the aperture of the lobe at 3 dB.

FIG. 5 in fact represents a net of curves 51, 52, 53, 54 which can be obtained by numerical calculation, for the case of a distance box $Q_d$ equal to 600 meters, each curve corresponding to a turbulence scale. It is apparent that the scale of the turbulence can be estimated by a function $\Psi$ which is a function which decreases as a function of y. It is obtained for example by numerical simulation, the scale $L_1$ satisfying the relation:

$$L_1 = \Psi(y, Q_d, Q_t) \quad (5)$$

According to the known schemes, the spectral moments are first calculated for each radar resolution cell independently of one another. The spectral moments are retrieved from an estimation of the temporal autocorrelation function of signals obtained in a given resolution cell.

In a resolution cell labelled by its central position $\vec{x}_0$, the "useful" meteorological signal possesses a temporal autocorrelation function which is Gaussian, centered in amplitude, and exhibits a linear phase gradient as a function of time proportional to the mean velocity in the pulse volume. Indeed, the radar signal stems from a multitude of echoes of tracers of random powers and having haphazard motions and velocities.

This temporal autocorrelation function:

is estimated at a discrete number of points $\vec{x}_i$ of the scanned spatial domain corresponding to a certain number of resolution cells, in terms of distance, azimuth and elevation;

is estimated only for a few delays which are multiples of the repetition period $T_R$.

By way of example, the autocorrelation function $R_K$ can be estimated by the "pulse-pair" technique known to those skilled in the art, s(i) denoting the complex signal received from the i$^{th}$ pulse in a particular resolution cell:

$$\hat{R}_K = \frac{1}{N-k} \sum_{i=0,N-k-1} s(i+k) \cdot s(i)^* \quad (6)$$

It is also possible to proceed on the basis of calculations of Fourier transforms of the signal, since the autocorrelation function is the Fourier transform of the Spectral Power Density.

The spectral moment of order 1, indicating the mean velocity, corresponds to the argument of $R_1$. It is an estimation which is ambiguous modulo $2\pi$. The mean Doppler velocity, i.e. the moment of order 1, is therefore:

$$M_1(\vec{x}) = V_{RM} = \left(\frac{\arg[R_1(\vec{x})]}{2\pi} + q\right) \times \frac{\lambda}{2T_R} \quad (7)$$

where q is wholly indeterminate in the case where the domain cannot be sufficiently bounded a priori in terms of velocity of the air mass analysed. This ambiguity is not specific to the calculation scheme based on the autocorrelation function and is found more generally with any spectral estimation scheme.

The spectral moment of order 2, indicating the velocity variance, is deduced from the Gaussian form of the autocorrelation function. The calculation of the standard deviation $\sigma_T$ of the autocorrelation function requires at least two measurement points. In the conventional case of the pulse-pair, $R_0$ and $R_1$ are employed. In the case of the polypulse-pair, it is possible to employ $R_0$, $R_1$, $R_2$ or indeed beyond. In the case of the pulse-pair, we obtain:

$$M_2(\vec{x}) = \left(\frac{\lambda}{2}\sigma_F\right)^2 = \frac{\lambda^2}{8\pi^2 \cdot T_R^2} \times \ln\left(\frac{R_0(\vec{x}) - \hat{b}}{|R_1(\vec{x})|}\right) \quad (8)$$

where $\hat{b}$ is an estimation of the noise of the receiver.

To implement the calculations which are the subject of relations (7) and (8) according to the known schemes, the two spectral moments $M_1$ and $M_2$ must be available for each resolution cell.

As regards the calculation of the moment of order 2, onboard radars currently operate in the X band and in order to obtain a sufficiently significant instrumented domain without distance ambiguity, they must have a relatively significant repetition period. When measuring intense turbulent phenomena, the correlations of delay greater than $T_R$ are thus often too weak and unutilizable. Under these conditions, the calculation of the moment of order 2 must be done using $R_0$ and $R_1$ according to relation (8). However, the term $R_0$ is biased by the reception noise which must be estimated and then deducted as shown by relation (8). As the estimation of the noise is inevitably marred by errors, it is necessary to ensure that $R_0$ is much greater than b, otherwise the estimation error may be significant.

The meteorological signal is a diffuse echo whose power fluctuates according to an exponential law. As a result, at low mean signal-to-noise ratio S/N, the field of usable measurements of $M_2$ may be extremely sparse.

As regards the calculation of the spatial variance of the moment of order 1, this variance calculation comes up against two main difficulties. As indicated previously, the waveform used possesses a small velocity ambiguity and a mean wind of unknown velocity may be superimposed on the turbulent phenomenon. Relation (7) shows that the mean velocity per resolution cell is ambiguous through ignorance of the whole number "q". To validly calculate the variance of the moment of order 1, its ambiguity must have been unravelled beforehand. Moreover, the meteorological signal is an echo with fluctuating power. As a result, even if the reflectivity is homogeneous, the signal received in certain distance-angle resolution cells may be too weak to perform a valid measurement of the moment of order 1. Stated otherwise, at low mean ratio S/N, the field of usable measurements of M1 may be extremely sparse.

The unravelling of the ambiguity in M1 is based on the assumption that the velocity variations between adjacent resolution cells, in terms of distance or angle, are small with respect to the velocity ambiguity of the waveform. It is then possible to interpret an abrupt break in the ambiguous velocity as a switch from one tier of ambiguity to the next. This principle presupposes the determination of a continuous unravelling path.

Thus, the sparse nature of the field of measurements of M1 considerably increases the complexity of the ambiguity unravelling algorithm, or indeed may render it inoperative.

Figure 6:
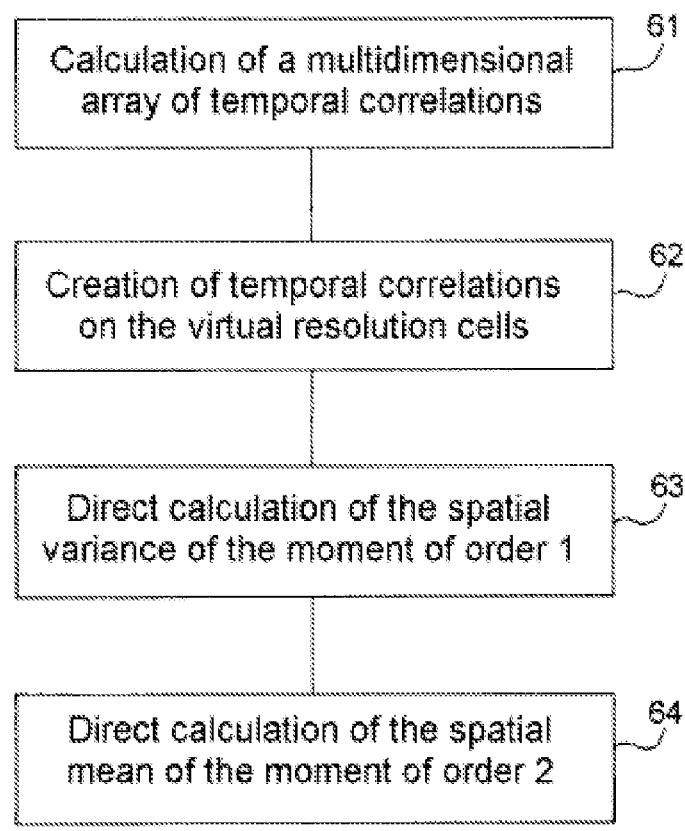
FIG. 6, a presentation of possible steps for an exemplary implementation of the method according to the invention.

FIG. 6 illustrates possible steps for the implementation of the method according to the invention as regards the determination of the variances and mean of the spectral moments. According to the invention the spatial variance of the moment of order 1 is calculated directly by forming virtual resolution cells. The size of these virtual cells is greater than the largest turbulence scale that is liable to be encountered. The spatial variance is obtained through a correlation scheme analogous to that which allows the determination of the velocity variance, equivalent to Doppler spectral spreading, in a real resolution cell. These virtual cells are obtained through signal processing operations. The spatial mean of the local velocity variance, moment of order 2, in the real resolution cells is then calculated.

Thus in a first step 61 a multidimensional array of temporal correlations is established, each box of the array corresponding to a radar resolution cell containing n temporal correlations. In a second step 62 the creation of temporal correlations on the virtual resolution cells is performed. In a third step 63 the direct calculation of the spatial variance of the moment of order 1 is performed and in a fourth step 64 the direct calculation of the spatial mean of the moment of order 2 is performed.

Figure 7:
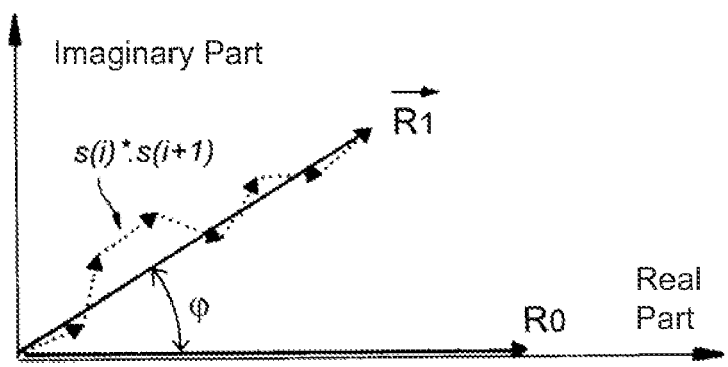
FIG. 7, an illustration of a temporal correlation calculation performed in a first possible step.

FIG. 7 illustrates the calculation of the correlations performed in the first step 61, according for example to the pulse-pair scheme. This first step 61 begins for example with the calculation, in each radar resolution cell, of the first two temporal correlations $R_0$ and $R_1$. The angles of detection constitute one dimension of the resolution cells and the distances constitute another dimension. The two correlations can for example be calculated according to relation (6).

FIG. 7 more particularly represents the correlations $R_0$ and $R_1$ in a system of axes where the abscissae represent their real part and the ordinates their imaginary part. $R_0$ is a real number and reflects the power of the signal received in a given resolution cell. $R_1$ is a complex number having a real part and an imaginary part as being the sum of the products of the signals received at the various pulses s(i)*.s(i+1) in accordance with relation (6). The modulus of $R_1$ relative to $R_0$ reflects the moment of order 2 of the signal. The argument $\phi$ of $R_1$ reflects the local value of the mean velocity of the turbulence, that is to say the moment of order 1. Indeed:

$$\varphi = \frac{4\Pi \cdot T_R}{\lambda} V_{Mean} \text{ modulo } 2\pi \qquad (9)$$

where $V_{mean}$ represents the mean velocity and $\lambda$, the wavelength of the signal emitted by the radar.

The exemplary calculation of the first step 61 uses only the first two correlations according to the pulse-pair scheme. However the first could also be applied in the case of the polypulse-pair with correlations of greater delays.

Figure 8:
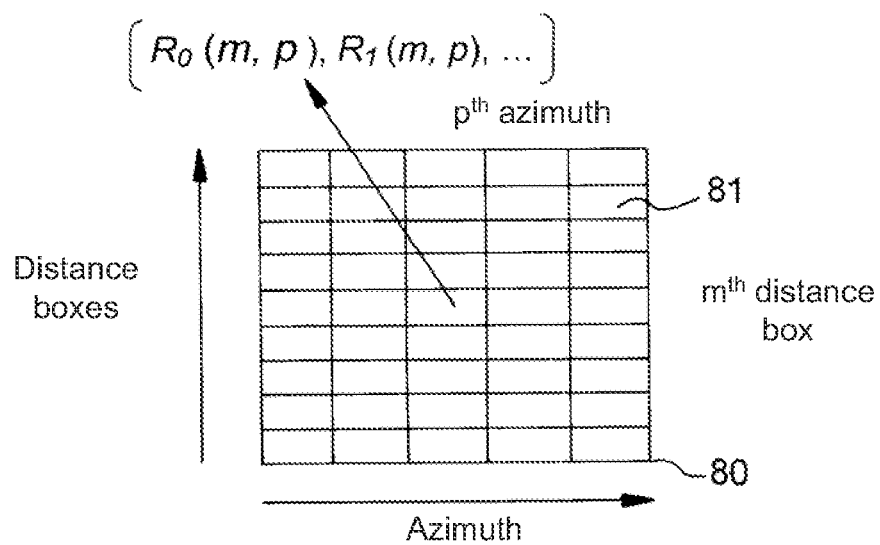
FIG. 8, a spatial array of temporal correlations which is obtained on completion of the aforesaid step.

FIG. 8 illustrates the spatial array of temporal correlations 8 that is obtained on completion of the first step 61. This array can be of dimension 1, 2 or 3. It is formed of boxes 81. Each box corresponds to a radar resolution cell, it contains an n-tuple corresponding to the n temporal correlations. This number n is reduced to two in the example described during step 1 with the two correlations $R_0$ and $R_1$. The dimensions of the array can be for example the distance, the azimuth and the elevation of each box of the array.

It is possible to use a three-dimensional array, but also a one-dimensional or two-dimensional array, for example the distance and the azimuth corresponding in fact to the example of FIG. 8. $R_0$ and $R_1$ are then defined for each distance box as a function for example of the $p^{th}$ azimuth and of the $m^{th}$ distance box.

Figure 9:
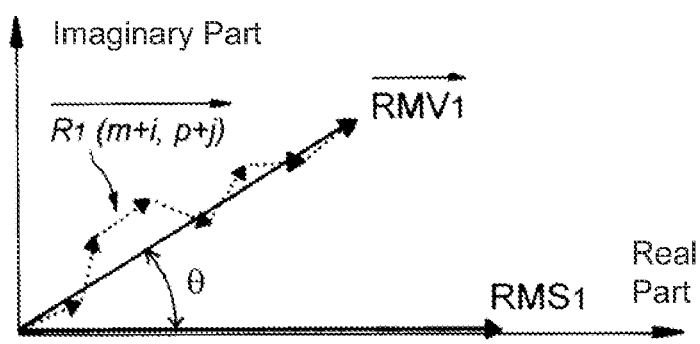
FIG. 9, an illustration of the vector and scalar spatial averages for the calculation of a spatial correlation obtained in a second possible step.

FIG. 9 illustrates vector and scalar spatial averages of the correlation $R_1$ which are obtained in the second step 62. In this step several types of sliding averages are calculated on each of the coefficients of the n-tuples, n possibly being equal to 2 as previously. These calculations of sliding averages involve the same number of dimensions as the previous array. They can be viewed as multidimensional convolutions with a kernel of 1, 2 or 3 dimensions. The dimensions of this convolution kernel correspond to those of the virtual resolution cell that one seeks to create.

The discrete sizes of the convolution kernel, number of cells of the kernel, depend on the resolution of the radar. It is possible to aim for the largest metric size of the kernel to be of the order of the largest turbulence scale liable to be analysed, for example 2000 meters. In this sense, the discrete sizes corresponding to the angular dimensions may be a function of distance. For each correlation coefficient, except for $R_0$ which is real, a vector sliding average RMV and a scalar sliding average RMS are calculated as the mean of the moduli. FIG. 9 illustrates the case with the first two correlations $R_0$ and $R_1$, therefore the vector sliding averages $RMV_1$ and $RMS_1$. These averages are given by the following relations (10) and illustrated in the system of real and imaginary axes of FIG. 9:

$$RM_0(m, p) = \frac{1}{(2a+1)(2b+1)} \sum_{i=-a}^{i=a} \sum_{j=-b}^{j=b} R_0(m+i, p+j) \qquad (10)$$

-continued $$RMS_1(m, p) = \frac{1}{(2a+1)(2b+1)} \sum_{i=-a}^{i=a} \sum_{j=-b}^{j=b} |\vec{R}_1(m+i, p+j)| \quad \text{(scalar mean)}$$

$$\vec{RMV}_1(m, p) = \frac{1}{(2a+1)(2b+1)} \sum_{i=-a}^{i=a} \sum_{j=-b}^{j=b} \vec{R}_1(m+i, p+j) \quad \text{(vector mean)}$$

The means are calculated for several boxes of the array of temporal correlations, that for example of FIG. 8, according to the dimensions between the sliding limits a and b. Each box y being defined by its coordinates m and p, $m^{th}$ distance box and $p^{th}$ azimuth. $RM_0$ is the mean for the first correlation.

In the third step 63, the direct calculation of the spatial variance of the moment of order 1 is performed.

FIG. 9 shows that the ratio $$\frac{RMS_1}{|\vec{RMV}_1|}$$

reflects the spatial variance of the argument of $\vec{R}_1$, stated otherwise, it reflects the spatial variance of the moment of order 1. The angle θ represents the weighted mean velocity in the large virtual resolution cell. In a manner analogous to relation (8), the spatial variance of the moment of order 1, Var(M1), is obtained through the following general relation where $f$ is an increasing function:

$$\text{Var}(M_1) = \frac{\lambda^2}{8\pi^2 \cdot T_R^2} \times f\left(\frac{RMS_1}{|\vec{RMV}_1|}\right) \quad (11)$$

Each vector $\vec{R}_1$ corresponding to a given resolution cell has an argument which is proportional to the ambiguous mean velocity in the resolution cell in question. The probability density of this mean velocity is a Gaussian:

centered around an ensemble velocity of the air mass in the virtual cell, that is to say the radial velocity of the wind which is superimposed on the turbulence.

with spatial variance Var(M1).

The ratio $$y = \frac{|\vec{RMV}_1|}{RMS_1}$$

is the mathematical expectation of the following random variable:

$$y = \cos(\varphi)$$

with: $\varphi = \frac{4\pi \cdot T_R}{\lambda} V_M$ i.e.:

$$y = \cos\left(\frac{4\pi \cdot T_R}{\lambda} V_M\right)$$

$V_M$ is a centered Gaussian random variable with variance Var(M1). By putting:

$$\sigma^2 = \left(\frac{4\pi T_R}{\lambda}\right)^2 \text{Var}(M_1) = 2f\left(\frac{RMS_1}{|\vec{RMV}_1|}\right) = 2f\left(\frac{1}{y}\right)$$

it can be shown that: y=g(σ) with:

$$g(\sigma) = \frac{2}{\sigma\sqrt{2\pi}} \int_0^\pi \cos(\theta) \exp\left(\frac{-\theta^2}{2\sigma^2}\right) d\theta$$

To obtain the function $f$ of relation (11), it is necessary to calculate $g^{-1}$.

$g(\sigma)$

However, this inverse function does not possess any simple analytical expression. The function $f$ can therefore conventionally be calculated by any numerical scheme.

The fourth step 64 performs the direct calculation of the spatial mean of the moment of order 2. This mean is calculated in a similar manner to relation (8) but modified for example as follows:

$$\text{Mean}(M_2) = \frac{\lambda^2}{8\pi^2 \cdot T_R^2} \times h\left(\frac{RM_0 - \hat{b}}{|RMS_1|}\right) \quad (12)$$

with: $h(x) \approx \ln(x)$

Indeed, if the turbulence is locally stationary, the ratios $$\frac{R_0}{|\vec{R}_1|}$$

are locally invariant. The calculation scheme of relation (12) exhibits the advantage that it is self-weighting as a function of the signal power in a given cell. The more significant the latter is in a cell, the more significant the weight of the measurements relating to this cell in the calculation of the spatial mean of $M_2$.

The function h is equal to the logarithm in the ideal case where:
the number of recurrences N used for the temporal correlations is very large;
there is no spectral aliasing;
the pulse repetition period is constant.

In the general case, the function h(x) has a similar shape to that of ln(x) and can be readily determined by numerical simulation schemes.

In a variant implementation of the invention, the moment of order 2 is calculated directly in the virtual resolution cells. Under these conditions the moment of order 2 measured in a virtual cell corresponds to the total velocity variance of the turbulent zone. The spatial variance of the moment of order 1 is then calculated by subtracting the mean local variance in velocity from the total variance of the velocity.

The invention claimed is:

1. A method for characterizing atmospheric turbulence for a point in space, the method comprising:
receiving radar signals for a plurality of real radar resolution cells, each real radar resolution cell delimiting a pulse resolution volume;
defining a virtual cell comprising two or more of the real radar resolution cells around the point in space;

calculating a spatial variance of a spectral moment of order 1 based on the radar signals received for the real radar resolution cells included in the virtual cell; and calculating a spatial mean of a spectral moment of order 2 based on the radar signals received for the real radar resolution cells included in the virtual cell; and calculating a total variance of the velocity of the turbulence as a characteristic of the turbulence for the point in space as a sum of the calculated spatial variance and the calculated spatial mean.

2. The method as claimed in claim 1, further comprising:
defining a plurality of virtual cells comprising two or more of the real radar resolution cells around a respective point in space;
for each subject virtual cell included in the plurality of virtual cells:
calculating a spatial variance of the spectral moment of order based on the radar signals received for the real radar resolution cells included in the subject virtual cell; and
calculating a mean of the spectral moment of order 2 based on the radar signals received for the real radar resolution cells included in the subject virtual cell.

3. The method as claimed in claim 2, wherein the defining a plurality of virtual cells comprises defining virtual cells of large dimension each including a plurality of real radar resolution cells.

4. The method as claimed in claim 3, wherein the dimension of a virtual resolution cell of large dimension is substantially equal to a largest expected scale of the turbulence.

5. The method as claimed in claim 2, further comprising:
calculating spectral parameters by carrying out temporal spectral analyses for each real radar resolution cell; and
performing sliding averages of the calculated spectral parameters.

6. The method as claimed in claim 5, wherein the calculating of the spectral parameters is based on the estimation of the temporal autocorrelation function per real radar resolution cell.

7. The method as claimed in claim 5, wherein the calculating of the spectral parameters is based on the estimation of the spectral power density per real radar resolution cell.

8. The method as claimed in claim 1, further comprising calculating injection scale of the turbulence from a ratio of the calculated spatial variance to the calculated spatial mean.

9. The method as claimed in claim 1, further comprising scanning an emission beam on the point in space with a radar onboard an aircraft.

10. The method as claimed in claim 1, further comprising alerting a crew of an aircraft based on the calculated total variance of the velocity of the turbulence.

* * * * *

UNITED STATES PATENT AND TRADEMARK OFFICE
CERTIFICATE OF CORRECTION

PATENT NO.       : 8,354,950 B2                                      Page 1 of 1
APPLICATION NO.  : 12/664813
DATED            : January 15, 2013
INVENTOR(S)      : Kemkemian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 282 days.

Signed and Sealed this
First Day of September, 2015

Michelle K. Lee
*Director of the United States Patent and Trademark Office*